Oct. 1, 1940.    S. ROSENBERG ET AL    2,216,213

CHAIN FASTENER

Filed Aug. 27, 1938.

INVENTORS:
SAMUEL ROSENBERG,
and THOMAS ROSENBERG,
BY Horace S Woodward
ATTORNEY.

Patented Oct. 1, 1940

2,216,213

UNITED STATES PATENT OFFICE 2,216,213

CHAIN FASTENER

Samuel Rosenberg and Thomas Rosenberg, New York, N. Y.; Gertrude Pousman administratrix of said Samuel Rosenberg, deceased Application August 27, 1938, Serial No. 227,215

5 Claims. (Cl. 59—93)

The invention relates to a fastener for chains, to be used, by way of example, for suspension of a sliding sash, and has for an object to provide a metal chain suspension of sufficient strength that many difficulties heretofore experienced with chain suspension will be overcome.

A most important object of the invention is to present novel means by which an oval link chain may be attached to the sash weight with a higher degree of safety than heretofore and where a positive tying of the chain is effected. Prior practice of using a hook device to connect the end of the chain to an inner part forming a loop through the eye of the sash weight has been found unsatisfactory owing to the opening of the hook incident to shocks when the weight is dropped considerably. Other forms of weight hooks have also been found unsatisfactory for similar and other reasons. Our chain enables a fastening stronger than the chain itself.

It is an important aim of the invention to enable the fastening of the sash weight or analogous article to the chain with great ease and rapidity.

Additional objects, advantages and features of invention reside in the construction, arrangement and combination of parts involved in the embodiment of the invention, as will be understood from the following description and accompanying drawing, wherein Figure 1 is a fragmentary section of a window frame illustrating a fastener in use.

Figure 1:
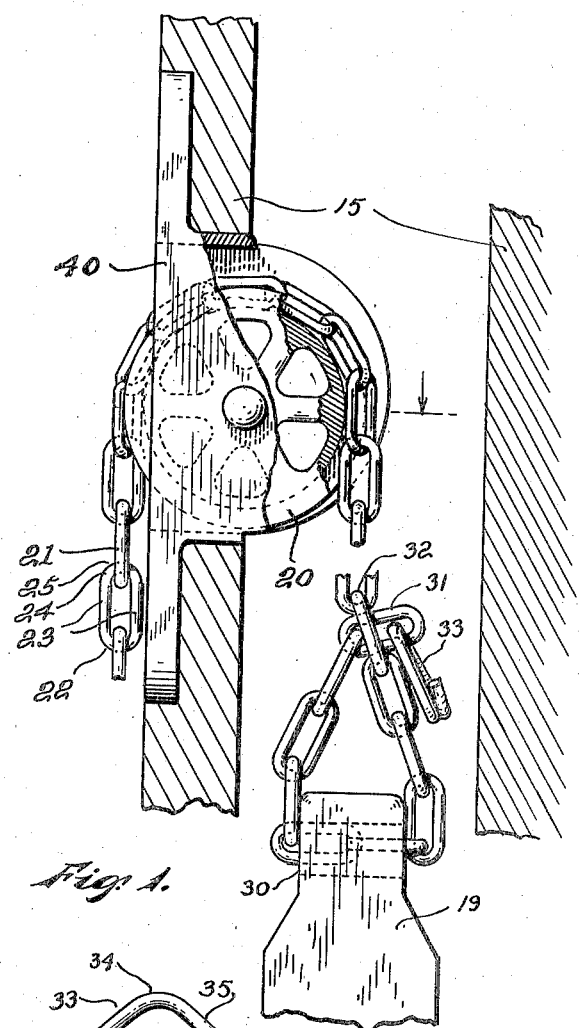
Figure 3:
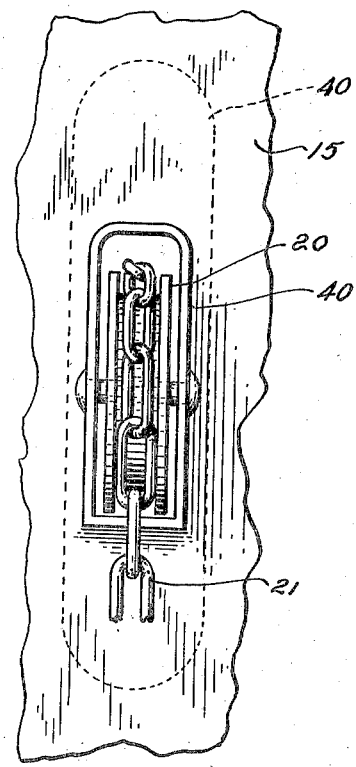
Figure 3 is a view from the right of Figure 1.
Figure 4:
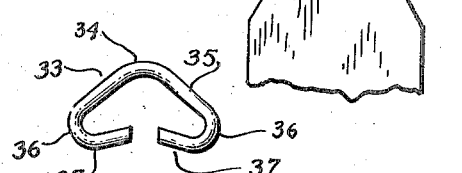
Figures 4 and 5 are details of the anchorage fastener.

There is illustrated a portion of a conventional window frame 15, the side members of which may conform to any approved practice to accommodate a sliding sash and counter weight. A sash 16 is shown, also of conventional and familiar construction. A counter weight 19 is shown, which may be of any usual form and material.

A familiar pulley 20 is shown mounted in the window frame, which may be the customary cord pulley for sash of the same weight, or may be a usual pulley for use with sash chain. Sash chain is a recognized commercial product and the term designates a chain formed of stamped blanks of sheet metal having pear-shaped apertured ends integral at their narrow parts, these being bent on a curve to form a bight or eye, and to bring the ends into registered contact, so as to receive commonly therethrough another blank of the same kind, which is then similarly bent. A chain thus formed is generally called a flat chain, and requires a pulley with a flat bottom groove for proper use.

We show a chain 21, which will function on either the standard cord pulley or the chain pulley with flat groove, and this chain is specially constructed to function in anchorage to the sash and to the counter-weight. It consists of a simple open link structure formed of a proper wire alloy of steel, bronze or other approved metal. When made of steel it is customarily copper plated electrically. It is formed from wire blanks cut and bent to produce a bight bend 22, from which side bars 23 extend substantially rectilinearly and approximately parallel for a distance and on the extremities of these bars respective semi-bight portions 24 are formed which are butt welded electrically by a suitable apparatus to form a complete bight 25. One standard size of chain made according to our invention is formed with links five-eighths of an inch in over-all length, and using wire of fourteen gauge; but these proportions may be varied as required to adapt the chain to various loads and sizes of fittings.

One end of the chain is anchored to the sash by any approved means. The opposite end of the chain is secured to the weight 19 by being inserted through the eye 30 conventionally formed on the weight, and drawn therethrough so that the terminal link 31 may be inserted through one of the links at 32 on the main part of the chain above the weight. This link is then secured in that position by means of a specially formed anchor fastener 33, which is the subject of this invention, engaged through the inserted end of the link. This fastener consists of a length of wire of the same comparative thickness as the wire composing the chain, or thicker, and pliable so that it will readily retain a form to which it is bent with a tool. This device is initially in the form substantially of a letter V, except that its central angle 34 is preferably obtuse instead of acute and the junction 34 of the two sides is rounded or curved, so that when the two parts are bent toward each other the junction will assume a curve corresponding to that at the bights 22 or ends of the links in the chain described. Two arms 35 are thus formed, and their outer end portions are curved inward toward each other on a curve 36 which is preferably of somewhat greater arc than that which the junction of the arms tend to assume when bent as mentioned and as hereinafter described. The ends 37 are extended beyond these curves in rectilinear form a short distance, approximately half the length of the arms 35 between their junction 34 and the curves 36, and these ends are turned slightly in opposite directions from the plane of the arms 34, so that when pressed toward each other they will come into lateral juxtaposition, as shown in Figure 1.

Figure 2:
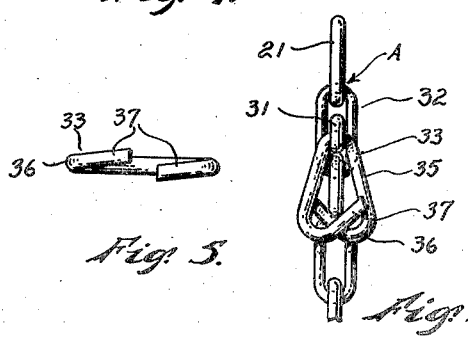
Figure 2 is a detail of the fastener in use.

To secure the link 31 when inserted through the chain at 32, one end of the fastener 33 in initial form, is inserted through the inserted bight of the link 31 which is projected through the chain, and the fastener then adjusted with the junction 34 adjusted in this bight. A pair of pliers or other suitable tool is then applied to the outer sides of the arms 36, and operated to press these toward each other, until the ends 37 come into close juxtaposition with the opposite arms 35, as shown in Figure 2.

Figure 5:
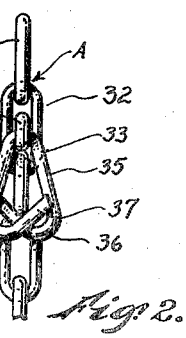

The initial form of the fastener 33 as described causes it to bend at the bight 34 when the ends of the arms 35 are pressed toward each other, the arms 35 approaching each other in a common plane with the bight and each other. The extremities, as may be seen in Figure 5, are displaced laterally from this plane just sufficiently to prevent them from so engaging as to interfere with the convergent movement of the arms 35, and in the final movement of the latter and the curves 36, the curves come into tight sliding engagement with each other. This may result in a slight displacement of the outer parts of the arms from their initial plane, but will tend also to cause slight rotation of the outer parts of the arms on their longitudinal axes, either of which is not detrimental to the function of the device, and will cause the lapped parts to be retained in tight pressed lapped relation.

By reason of the divergent relation of the ends 37 to the arms 35 when the member 33 is bent to its locked or closed position as shown in Figure 6, the end portion 37 of each arm lies longitudinally inward of the bight portion 36 of the other arm, and the extremity of the end 37 lies beside the opposite arm 35. As a result, if this fastener 33 is extendeed longitudinally from the link 31 or other link with which it is engaged, the lapped part of the fastening cannot be passed through the engaged chain link by swinging and sliding movement of the fastening, because the end 37 will strike against the side of the link of the chain and prevent such entry. On the other hand, if the fastening 33 is hung at right angles from one side bar of a chain link and then one arm 35 moved slidably into the chain link and an attempt made to engage the side of the chain link in the larger end of the fastening, such movement is blocked by the end portion 37 lying inward of the bight 36 of the arm 35 so moved. Consequently, the form of the device is such as to insure that the bight 34 or an arm 35 are the only parts which may be positioned in the engaged link 31. These are the parts having the maximum strength to resist distortion incident to the severe shocks which may be caused by abrupt movements of sash, or dropping of the sash weights a distance, as happens in the use of such sash suspensions.

It should be appreciated, too, that there is a substantial element of weight in the ends 37 which makes the larger end of the fastener so much heavier than the end 34, that the latter will tend to always be maintained in the link 31 with the heavier end suspended therefrom.

We claim:

1. A fastener for the uses described consisting of a substanstially V-shaped member of deformable wire, the arms of which diverge at an angle less than 180 degrees, the outer end portions of the arms being recurved inward toward but stopping short of each other to form respective end bights and a gap therebetween for entrance of a part to be secured, their extremities only being displaced laterally from the plane of the arms sufficiently to pass each other when said arms are moved toward each other by bending of the junction portions of the arms, and being adapted to be moved into overlapped relation to form a closed ring of substantially pear-shaped form with said arms divergent at an acute angle, the larger part consisting of the overlapped ends aforesaid, the recurved end of each arm being disposed divergently with respect to the immediately joined arm and extended sufficiently to lie inward of the bight of the other end and with its extremity beside the opposed arm, when in closed form.

2. A fastener of the class described consisting of a substantially V-shaped member the arms of which diverge at an angle in a common plane, the outer end portions being recurved inward toward but stopping short of each other to form a gap for entrance of a part to be secured, the outer ends of the recurved parts being extended divergently from their respective arms, and being displaced at their extremities only in opposite directions from the plane of the arms to slidably coengage each other in lapped relation when the arms are pressed toward each other with bending of the junction of the arms.

3. A fastener of the class described consisting of a member of deformable wire having two arms extended at an oblique angle to each other and having their outer end portions incurved to form respective wide and open bights the outer ends of the bights being extended a distance divergently from their arms and each being of sufficient length to be bent as an eye to encircle the side of a chain link, the end portions being projected toward each other but spaced apart from each other to receive chain portions therethrough.

4. The structure of claim 2 in which said outer ends of the recurved parts are extended rectilinearly a distance at an acute angle to the respective joined arms.

5. The structure of claim 3 in which said outer ends of the bights are extended a distance rectilinearly each at an acute angle to the arm from which it springs.

SAMUEL ROSENBERG.
THOMAS ROSENBERG.